United States Patent
Vajravel et al.

(10) Patent No.: US 10,148,755 B2
(45) Date of Patent: Dec. 4, 2018

(54) SYSTEM AND METHOD TO REDIRECT USB MASS STORAGE DEVICES IN HIGH LATENCY VDI ENVIRONMENTS

(71) Applicant: Dell Products L.P., Round Rock, TX (US)

(72) Inventors: Gokul T. Vajravel, Bangalore (IN); Ramanujam K. Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 435 days.

(21) Appl. No.: 14/837,920

(22) Filed: Aug. 27, 2015

(65) Prior Publication Data
US 2017/0063988 A1    Mar. 2, 2017

(51) Int. Cl.
*H04L 29/08* (2006.01)
*H04L 12/26* (2006.01)
(Continued)

(52) U.S. Cl.
CPC .......... *H04L 67/1097* (2013.01); *G06F 3/061* (2013.01); *G06F 3/067* (2013.01); *G06F 3/0632* (2013.01); *G06F 3/0664* (2013.01); *G06F 9/4411* (2013.01); *G06F 13/4068* (2013.01); *G06F 13/4282* (2013.01);
(Continued)

(58) Field of Classification Search
CPC ..... H04L 67/1097; H04L 67/28; H04L 67/42; H04L 67/2823; H04L 43/08; H04L 47/12; H04L 69/08; G06F 2009/45583; G06F 2009/44579; G06F 3/0605; G06F 9/4413; G06F 9/54; G06F 3/061; G06F 3/0632; G06F 3/0664; G06F 3/067; G06F 9/4411; G06F 13/4068; G06F 13/4282
See application file for complete search history.

(56) References Cited

U.S. PATENT DOCUMENTS 5,740,370 A * 4/1998 Battersby .......... G06F 17/30132
707/999.01
6,076,111 A * 6/2000 Chiu .............. H04N 21/234363
709/203
(Continued)

OTHER PUBLICATIONS

FSCTL_LOCK_VOLUME control code by Microsoft at <https://msdn.microsoft.com/en-us/library/windows/desktop/aa364575(v=vs.85).aspx>, 2015, 3 pages, printed Jul. 28, 2015.
(Continued)

*Primary Examiner* — Le H Luu
(74) *Attorney, Agent, or Firm* — Baker Botts L.L.P.

(57) ABSTRACT

In certain information handling system environments, physical devices connected to a client are redirected to a server or other information handling system. Read and write transaction requests to these redirected devices will use and occupy network bandwidth. Allowing the client to unmount its file system (if present) and locking its disk stack while permitting the server to load a virtual disk enumerator and file system stack for the processing of transaction requests to the virtual disk provides efficiency in the amount of network bandwidth required for any given transaction request. In such a system, the server processes overhead related to the transaction requests at the server and thus executes fewer transactions requests to the client.

20 Claims, 7 Drawing Sheets

(51) Int. Cl.

| | | |
|---|---|---|
| *H04L 12/801* | (2013.01) | |
| *G06F 13/40* | (2006.01) | |
| *G06F 13/42* | (2006.01) | |
| *G06F 3/06* | (2006.01) | |
| *G06F 9/4401* | (2018.01) | |
| *H04L 29/06* | (2006.01) | |

(52) U.S. Cl.
CPC .............. *H04L 43/08* (2013.01); *H04L 47/12* (2013.01); *H04L 67/28* (2013.01); *H04L 69/08* (2013.01)

(56) References Cited

U.S. PATENT DOCUMENTS

| | | | | |
|---|---|---|---|---|
| 6,356,941 | B1* | 3/2002 | Cohen | G06F 21/6272 709/219 |
| 6,721,863 | B1* | 4/2004 | Endo | G06F 3/0613 711/100 |
| 7,996,631 | B1* | 8/2011 | Bender | G06F 3/0617 709/203 |
| 8,347,008 | B2* | 1/2013 | Kumar | G06F 13/4009 710/106 |
| 8,504,707 | B2* | 8/2013 | Toebes | H04L 67/2823 370/465 |
| 8,667,157 | B2* | 3/2014 | Poe | H04L 67/08 709/217 |
| 8,726,273 | B2* | 5/2014 | Le | G06F 9/5077 718/1 |
| 9,032,246 | B2* | 5/2015 | Woodhouse | G06F 11/1076 714/6.24 |
| 9,053,246 | B2* | 6/2015 | Moore | G06F 13/362 |
| 9,116,821 | B2* | 8/2015 | Scragg, Jr. | G06F 13/10 |
| 9,141,325 | B2* | 9/2015 | Dersy | G06F 9/4445 |
| 2009/0106493 | A1* | 4/2009 | Tsuji | G06F 3/0605 711/114 |
| 2010/0146000 | A1* | 6/2010 | Greggs | G06F 13/385 707/792 |
| 2010/0169071 | A1* | 7/2010 | Oltuszyk | G06F 13/385 703/24 |
| 2011/0246984 | A1 | 10/2011 | Sharp et al. | |
| 2012/0158822 | A1* | 6/2012 | Dai | G06F 9/4413 709/203 |
| 2013/0132671 | A1* | 5/2013 | Woodhouse | G06F 11/1076 711/114 |
| 2013/0297718 | A1* | 11/2013 | Singh | G06F 3/0673 709/213 |
| 2013/0312096 | A1* | 11/2013 | Larsen | G06F 9/45558 726/24 |
| 2015/0199375 | A1* | 7/2015 | Prahlad | G06F 17/30212 707/610 |
| 2016/0253093 | A1* | 9/2016 | Zhang | G06F 12/08 |
| 2016/0342519 | A1* | 11/2016 | Liashenko | G06F 12/1009 |

OTHER PUBLICATIONS

Universal Serial Buss Mass Storage Class, Bulk-Only Transport, Revision 1.0, Sep. 31, 1999, USB Implementers Forum, 22 pages, <http://www.usb.org/developers/docs/devclass_docs/usbmassbulk_10.pdf>.

FSCTL_DISMOUNT_VOLUME control code by Microsoft at <https://msdn.microsoft.com/en-us/library/windows/desktop/aa364562(v=vs.85).aspx>, 2015, 3 pages, printed Jul. 28, 2015.

U.S. Patent Application entitled System and Method to Improve USB Mass Storage Device Arrival Acceleration for Redirected USB Mass Storage Devices by Ramanujam K. Venkatesh et al. filed Aug. 26, 2015.

* cited by examiner

SYSTEM AND METHOD TO REDIRECT USB MASS STORAGE DEVICES IN HIGH LATENCY VDI ENVIRONMENTS

TECHNICAL FIELD

This disclosure generally relates to redirection of a universal serial bus (USB) mass storage device as a generic disk device such that requests received by the virtualized USB mass storage device are serviced by the disk stack at the client.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Prior universal serial bus (USB) technology utilized in VDI environments emulated virtual USB hardware on a virtual USB bus driver on an information handling system, such as a server. The operating system (OS) of the server loaded a real driver and applications for the virtual USB hardware in the same way as such would be loaded for real physical hardware. When the application tried to access or use a virtual device or virtual hardware, the requests from the application would be translated as transaction requests (for example, URB) directed to the virtual USB hardware on the server. The virtual USB bus driver redirected the USB request block (URB) transactions to another information handling system, such as a client, where the real physical hardware was actually located. The received transaction requests from the server were then submitted to the real USB hardware via a stub driver on the client. The resulting responses from the real USB hardware would then be transported back to the server and pumped to the virtual USB bus driver. The virtual USB bus driver then passed these responses back to the respective applications via the real driver, thus completing the loop.

These USB virtualization solutions are a request and response architecture. Data is read from the virtualized USB mass storage device by making multiple read requests (including device probe requests) in that a single read request cannot read the complete data. This causes delay while the data is being accessed. In a high latency network, the delay may be increased and packet loss may occur making the virtualized USB mass storage device unusable, costly, or ineffective. The present disclosure provides systems and methods for this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
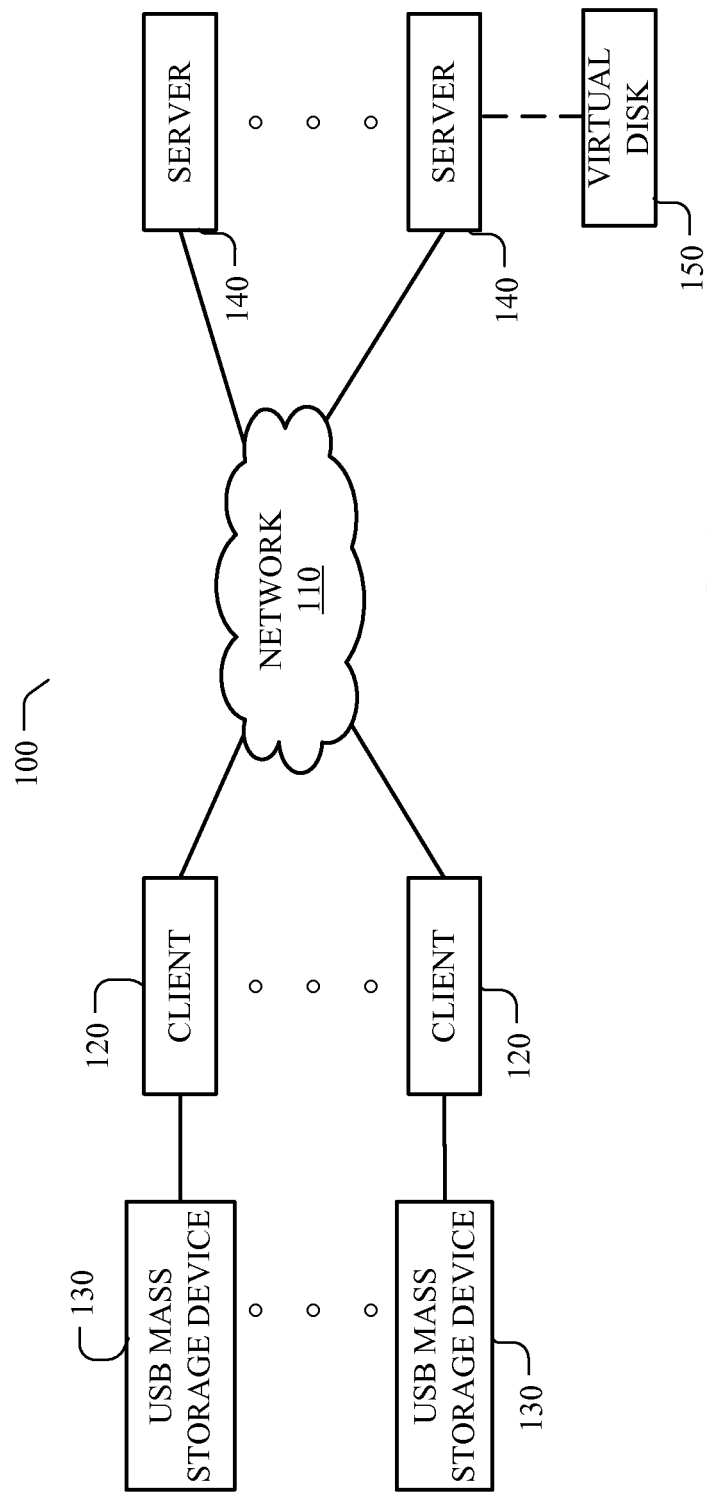
FIG. 1 illustrates an example configuration of networked information handling systems according to one embodiment of the present disclosure.

This disclosure generally relates to remote computing and, in particular, relates to virtualizing a universal serial bus (USB) mass storage device as a 'generic disk' device (virtual disk) at the server with any read/write requests received by the virtual disk being transferred to the client's disk stack via the proxy server and proxy client. The proxy server via a USB virtual disk enumerator processes the requests (read and write requests) to the virtual disk such that the transaction burden across the network is reduced. This is especially beneficial in a high latency network where the burden of at a minimum five transaction requests per read/write command may result in the loss of data or such delays that the virtual disk is not usable. In one embodiment of the present disclosure only two transaction requests are transmitted per read/write in that no additional USB overhead transaction requests need be transmitted. The present disclosure is also advantageous as it is oblivious to the USB hub/controller type and the bus speed as the USB hub driver is present only at the client side where the USB hub driver hides and abstracts this information; support large data transfer as USB data transfer size is dictated by the maximum transfer length of the USB endpoint or pipe which is advertised by the USB hub driver at the client side for every USB device connected to the client; provides a data transfer speed on par with network drive mapping by reducing the volume of transaction requests; requires less bandwidth compared to traditional USB mass storage device redirection because there is no USB packet overhead (for example, USB request block (URB)), the number of requests per transaction is reduced to two, and the architecture supports large data transfers; and supports disk management functions like partitioning, formatting and changing the file size which may not be available on a thin client that does not have a complete file system stack but are available at the server for the virtual disk.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations.

According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to universal serial bus (USB) printers, USB scanners, USB mass storage devices, and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a USB mass storage device is connected to a given client via a standard USB connection, the locally connected USB mass storage device may be redirected to a server. The redirected USB mass storage device may then be installed locally for use by any number of clients. The server treats the USB mass storage device as a virtual mass storage device attached to the server.

FIG. 1 at 100 illustrates an example configuration of a networked information handling system. In particular embodiments, one or more client devices 120 and one or more servers 140 are connected via network 110. Many types of peripheral devices may be connected locally to the client devices 120. As shown in FIG. 1, in some embodiments, one or more USB mass storage devices 130 connect to client devices 120. According to the present disclosure, one or more USB mass storage devices 130 may appear to one or more of servers 140 as if they are locally installed on and connected to those servers 140. In certain embodiments, these USB mass storage devices 130 may be redirected such that they appear to be locally installed or locally shared with another client 120. In one embodiment, the Dell Wyse TCX USB Virtualization is used to virtualize the USB mass storage device 130. In one or more embodiments, one or more USB mass storage devices 130 may be virtualized as a 'generic disk' device (a virtual disk 150) at a server 140.

Figure 2:
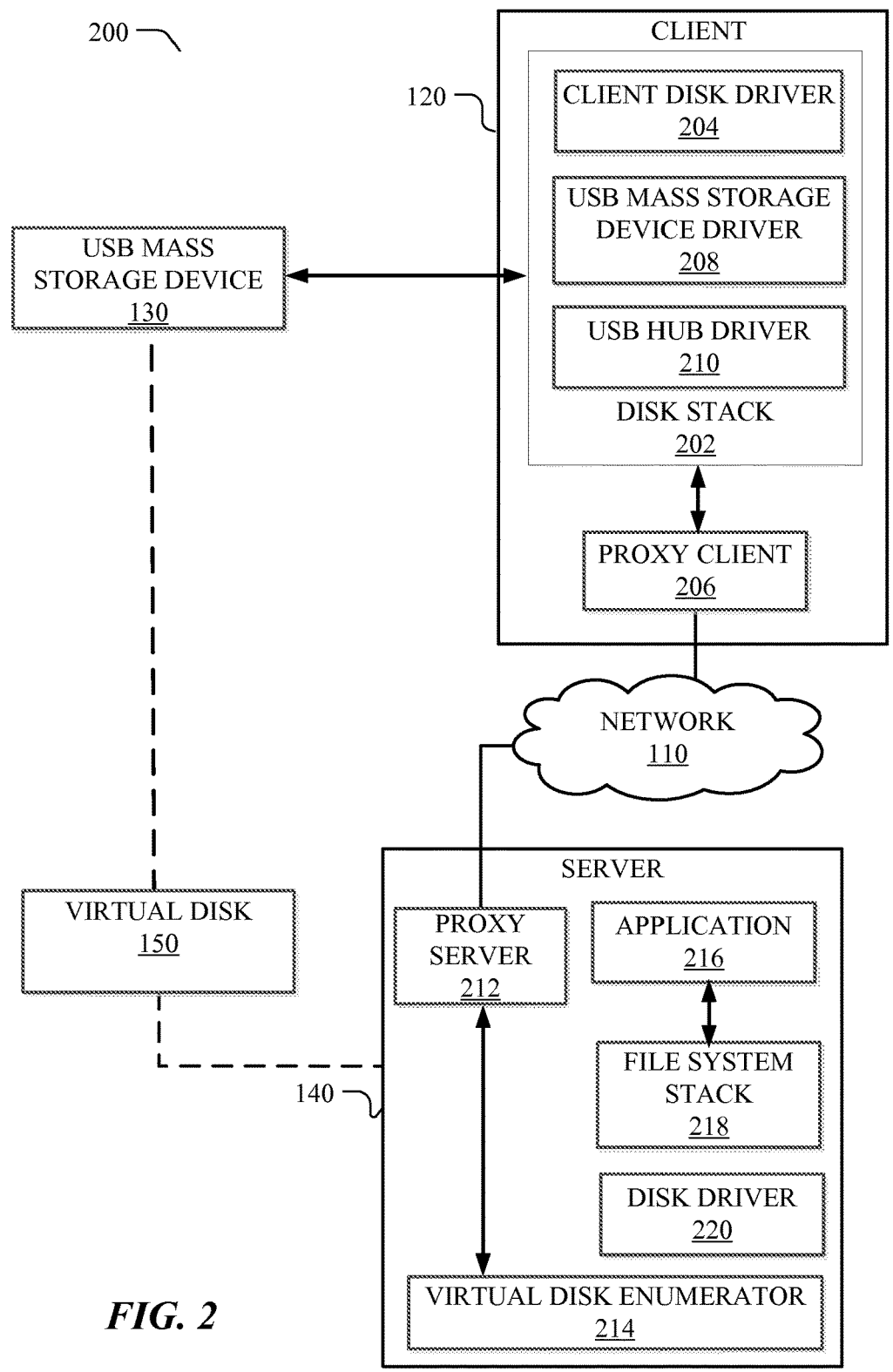
FIG. 2 illustrates an example system of a networked client and server according to one embodiment of the present disclosure.

FIG. 2 at 200 illustrates an example embodiment of a system configured to redirect a USB mass storage device 130, for example, a USB hard disk drive. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

Client 200 includes a disk stack 202. Disk stack 202 includes a client disk driver 204, a USB mass storage device driver 208 and a USB hub driver 210. The client disk driver 204 manages disks, including USB mass storage device 130, and converts any generic read and write requests to the appropriate storage request. The client disk driver 204 receives any data from one or more applications 216 directed to the virtual disk 150. The data passes through the USB mass storage device driver 208 and then to the USB hub driver 210 where the USB hub driver 210 breaks the data in multiple data transfers for transmission to the USB mass storage device 130.

Client 200 recognizes USB mass storage device 130, which is connected locally. The client 120 loads the USB mass storage device driver 208. The USB mass storage device driver 208 manages the USB mass storage device 130 and converts any generic read and write requests to the appropriate URB. The USB mass storage device driver 208 loads the client disk driver 204. The USB hub driver 210 primarily manages the USB hubs and corresponding ports and enumerates any USB devices connected to these ports. Client 120 may be configured to automatically install all or only certain USB mass storage devices 130 locally, may be configured to automatically redirect all or certain USB mass storage devices 130 to server 140, or may be configured to request input from a user of client 120 or from another source to determine whether to install a particular USB mass storage device 130 or interface locally or to redirect it.

If a USB mass storage device 130 is configured to be redirected to server 140, the redirection may operate generally as described in U.S. Pat. No. 8,010,630 to Barreto, et al., which is incorporated herein by reference. In particular embodiments, client 120 connects to server 140 via network 110. Network 110 may be a high latency network. A proxy client 206 on client 120 may coordinate communications between USB mass storage device 130 and the proxy server 212 of server 140. In particular, proxy client 206 may be configured to receive socket connection information from proxy server 212 of server 140 and initiate redirecting device transactions to and from USB mass storage device 130 to proxy server 212 on server 140.

USB mass storage devices, such as USB mass storage device 130, adhere, in general, to the USB mass storage bulk only transport (BOT) specification/protocol. Per the BOT protocol, every read/write request must sequence through the following transactions: 1) Command Block Wrapper (CBW) transfer [command]; 2) CBW completion; 3) data transfer; 4) Command Status Wrapper (CSW) request [get status]; 5) CSW completion [data transfer status]. At a minimum, generally every USB mass storage device 130 read/write requires executing five transactions. The data transfer size will be limited to the USB mass storage device's 130 maximum transfer size.

Figure 7:
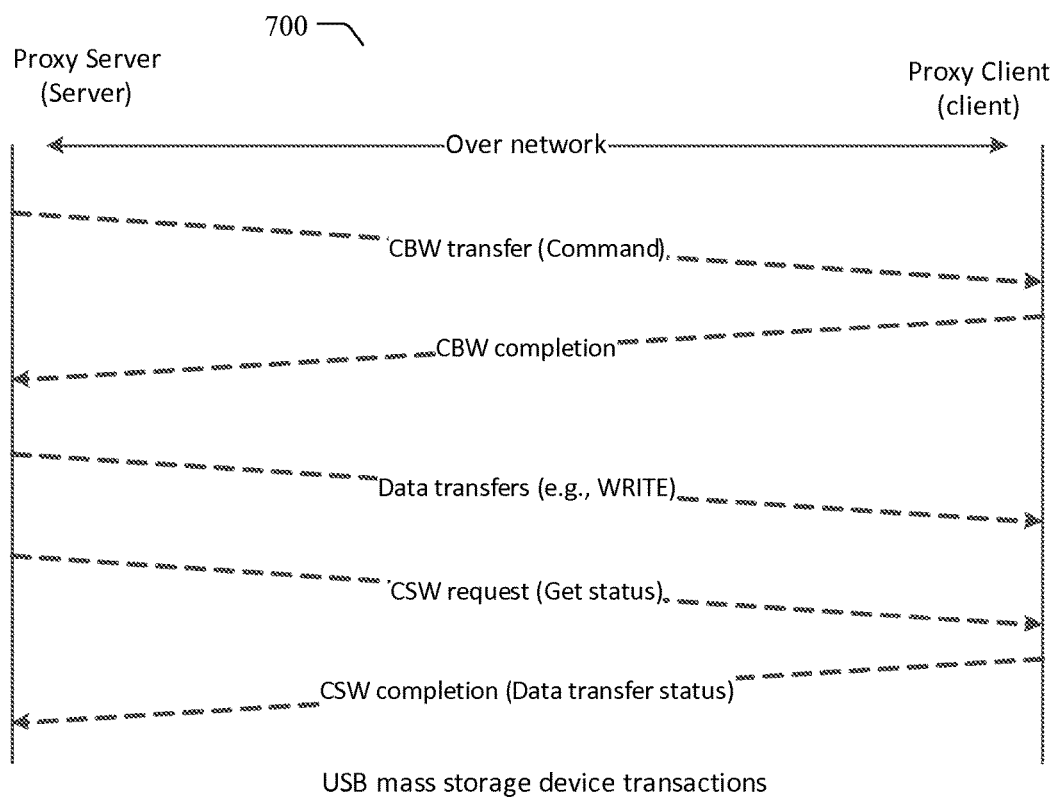
FIG. 7 illustrates transaction requests between a client and server for a virtualization environment according to one embodiment of the present disclosure.

These transactions to/from the client 120 from/to the server 140 are illustrated in FIG. 7. In general, five types of transaction are depicted. In general, for each read and write the back and forth between the proxy server 212 and proxy client 206 must occur. In a high latency network this minimum number of transactions may take a long period of time to complete and may result in packet loss. If packets are lost, the transaction requests will need to be retried increasing the delay even more. Such a delay may make the USB mass storage device 130 unusable or too costly.

To solve this problem, the USB mass storage device 150 is virtualized as a 'generic disk' device, virtual disk 150 at server 140. The proxy server 212 of server 140 loads the virtual disk enumerator 214. The disk driver 220 of the server 140 is loaded and the OS loads on top the file system stack 218 if the virtual disk 150 is already formatted with a file system. (permitting an application 216 to store and retrieve files on the virtual USB disk 150). With the disk driver 220 only raw reads and writes are possible with file level information only available and maintained by the file system. For example, only reading from and/or writing to sector 0 (the first 512 bytes) of the virtual disk 150 is available to the disk driver 220. For file level access, a file system is required and the virtual disk 150 must be formatted with a file system (for example, new technology file system (NTFS), file allocation table (FAT), FAT32, ex-FAT). For example, the server 140, in one embodiment, may partition, format or change the file system of the virtual disk 150 (and consequently the USB mass storage device 130).

Once the virtual disk 150 is created by the virtual disk enumerator 214, application 216 may be able to access the virtual disk 150 with the disk driver 220 while the file system stack 218 associated with the virtual disk 150 processes these requests by converting them to the appropriate storage read/write request. Application 216 may be one or more applications that reside locally at the server 140 or may be one or more virtual applications. The overhead associated with a read/write request from an application 216 is handled by the disk driver 220 and file system stack 218 reducing the number of read/write transactions that must be sent to the client 120. The virtual disk enumerator 214 transmits the storage read/write requests to the proxy server 212. Proxy server 212 then transmits the read/write requests to the proxy client 206. Proxy client 206 communicates with the USB mass storage device 130 via the disk stack 202. The operation of the elements of FIG. 2 is further described below with respect to FIG. 3 and FIG. 4.

The application 216 may make requests to access one or more virtual disks 150. These requests may require at a minimum the five transactions as illustrated in FIG. 7. In one embodiment of the present invention, the server 140 handles all the overhead associated with a request to access one or more virtual disks 150 as further described with respect to FIG. 5.

Figure 3:
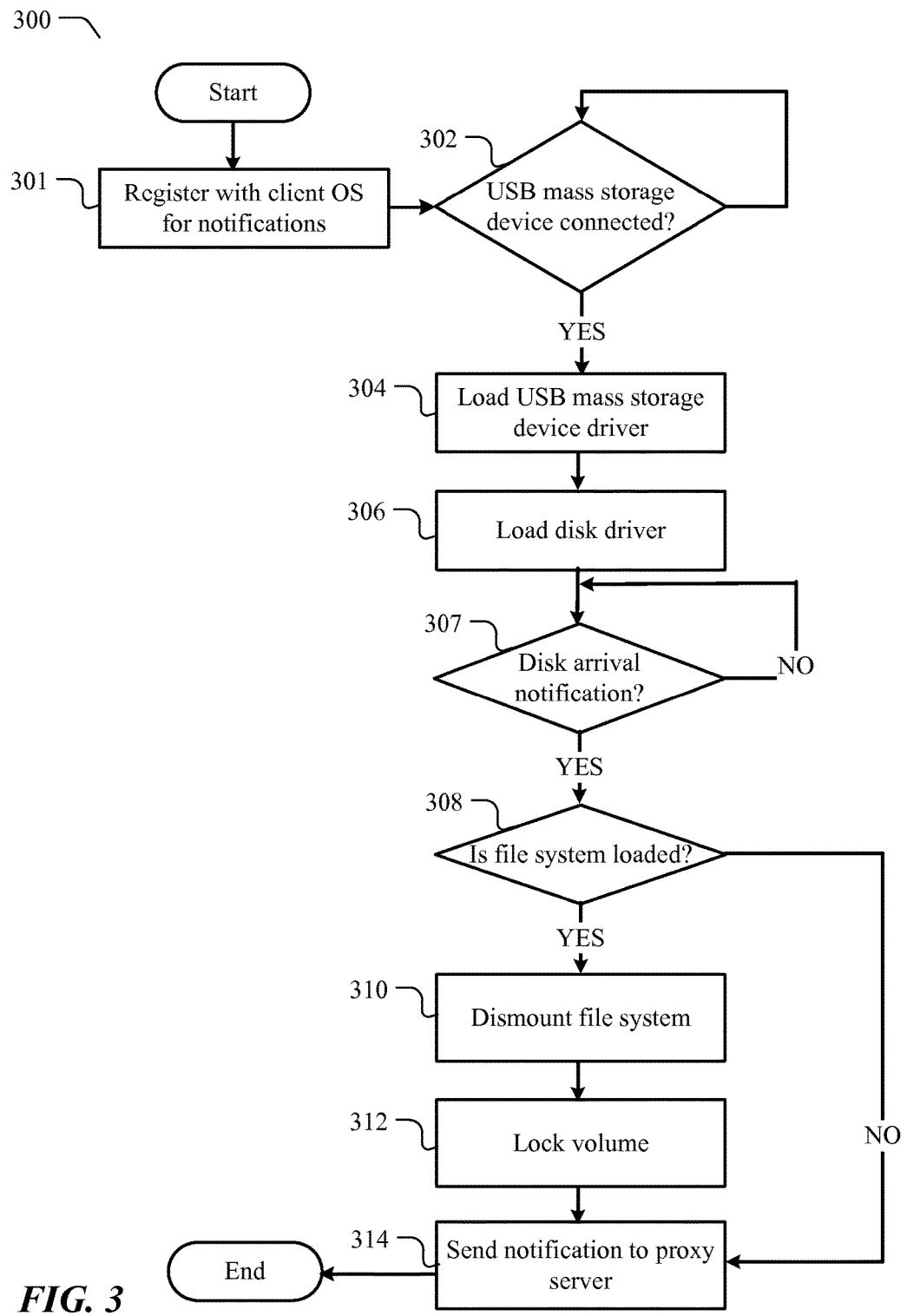
FIG. 3 illustrates an example of steps involved in one method according to one embodiment of the present disclosure.

FIG. 3 is a flow chart in accordance with an embodiment of the present disclosure, shown generally at 300, relating to preparation of the client 120 for redirection of a USB mass storage device 130 such that access to the USB mass storage device 130 does not require the execution of multiple transactions. The proxy client 206 registers with the OS at the client 120 at step 301 for device arrival notification of the type associated with the USB mass storage device 130. Once the USB mass storage device 130 is connected to the client 120, the OS of the client 120 will notify the proxy client 206 with the device type information and the proxy client 206, based, at least in part, on this information will lock the USB mass storage device 130 as discussed in the following steps.

At step 302, the client 120, via proxy client 206, polls to determine if a USB mass storage device 130 is connected to client 120. Proxy client 206 may determine if a USB mass storage device 130 is connected by any process known to one of ordinary skill in the art. For example, in one embodiment a user may use a graphical user interface (GUI) to inform the client 120 that a USB mass storage device 130 has been connected. In another embodiment, the client 120 may automatically detect without user intervention the connection of a USB mass storage device 130. USB mass storage device 130 may be any known mass storage device including, but not limited to, a USB thumb drive, a USB hard disk drive or any other USB storage device known to one of ordinary skill in the art that may be coupled to the client 120 via a USB. Client 120 may poll for a connection in any way known to one of ordinary skill in the art, including, but not limited, waiting on an interrupt, timer, semaphore, etc. that indicates connection of a USB mass storage device such as USB mass storage device 130.

If a USB mass storage device 130 is connected (either directly or communicatively) to the client 120, then at step 304, the client 120, via proxy client 206, loads a USB mass storage device driver 208 associated with the USB mass storage device 130. At step 306, the USB mass storage device driver 208 loads an associated client disk driver 204. At step 307, the proxy client 206 waits for the disk arrival notification from the OS. In one embodiment the process continues to loop at step 307 until a disk arrival notification is received. In another embodiment, the process may send an error notification if a disk notification is not received within a predetermined time period. In another embodiment, the process may end without sending an error notification if a disk arrival notification is not received within a predetermined time period. The disk arrival notification instructs the USB mass storage device 130 that the USB mass storage device 130 has been properly loaded and is accessible.

If a disk arrival notification is received, then at step 308, the client 120, via proxy client 206, determines if the file system is loaded. If the file system is not loaded, then the process continues at step 314 without loading any file system. In general, if a file system is loaded, a raw write (for example, write operation bypassing the mounted file system) operation to a USB mass storage device 130 is prohibited. In one embodiment of the present invention, this type of raw write must occur so that multiple transactions are not executed for every read/write request to the USB mass storage device 130. Thus, if the file system is loaded, at step 310, the file system is dismounted. The file system may be dismounted issuing a command, such as FSCTL_DISMOUNT_VOLUME. This will ensure that the read/write requests from the server 140 are serviced properly at the client 120.

At step 312 the volume is locked. The volume may be locked by issuing a command, such as FSCTL_LOCK_VOLUME. Locking the volume includes locking the disk stack 202. This prevents any application from accessing the USB mass storage device except through the proxy client 206. At step 314, the proxy client 206 sends a notification, such as a plug-in notification, to the proxy server 212 that a USB mass storage device is prepared for virtualization at the server 140. The notification may contain one or more disk properties including, but not limited to, sector size, disk size, vendor identification, product identification, device type, manufacturer identification and any other disk property known to one of ordinary skill in the art.

Figure 4:
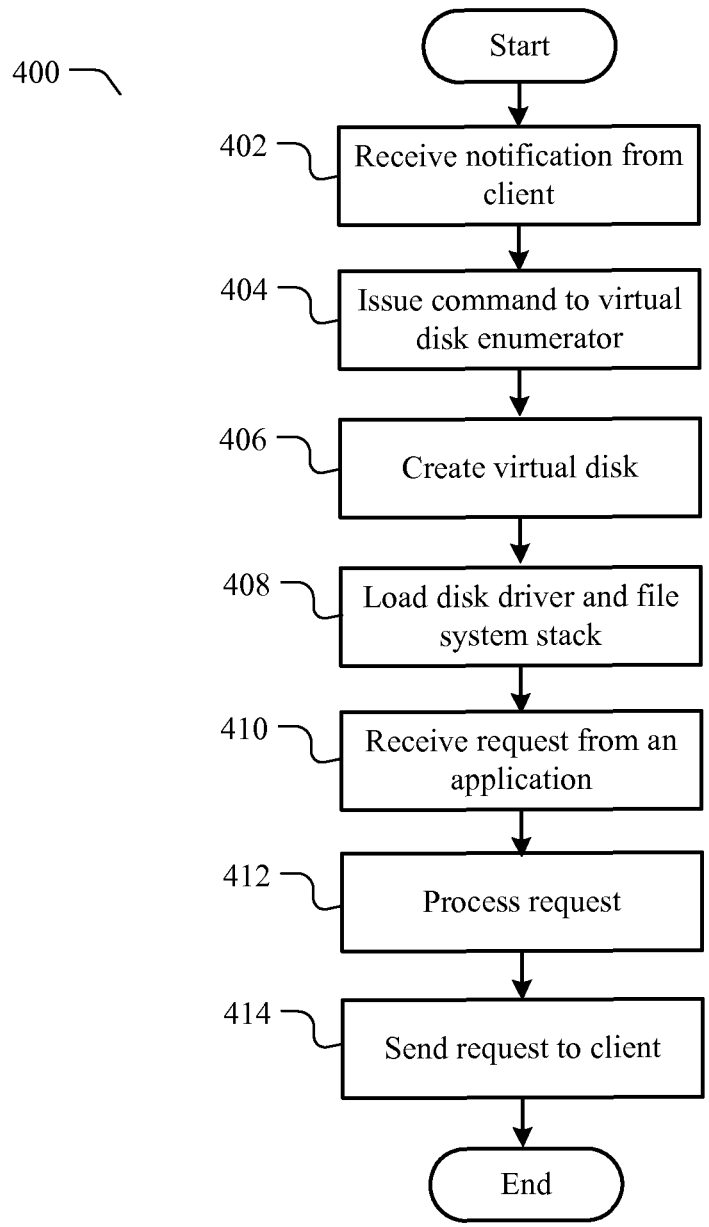
FIG. 4 illustrates an example of steps involved in one method according to one embodiment of the present disclosure.

FIG. 4 is a flow chart in accordance with one embodiment of the present invention shown generally at 400. At step 402, the server 140 receives a notification from the client 120 that a USB mass storage device 130 is ready for virtualization such that it may be accessed from one or more applications 216. The notification is sent from the proxy client 206 to the proxy server 212. At step 404, the proxy server 212 issues a command to the virtual disk enumerator 214 to create the virtual disk 150. The command may be an input/output control (IOCTL) command or any other such command known to one of ordinary skill in the art. The virtual disk enumerator 214 at step 406 creates the virtual disk based, at least in part, on any one or more of the disk properties associated with the notification.

At step 408, the disk driver 220 and file system stack 218 are loaded by the OS based, at least in part, on one or more disk properties of the virtual disk 150 associated with the USB mass storage device 130. Once step 408 is completed, a request is received by one or more applications 216. The request is received by the virtual disk 150 via the virtual disk enumerator 214 at step 410. At step 412, the request is processed. The transaction requests received by the disk driver 220 from the virtual disk enumerator 214 are either read requests or write requests. If the file system is loaded, the file read requests and write requests will be converted to storage read/write requests by the disk driver 220.

Figure 5:
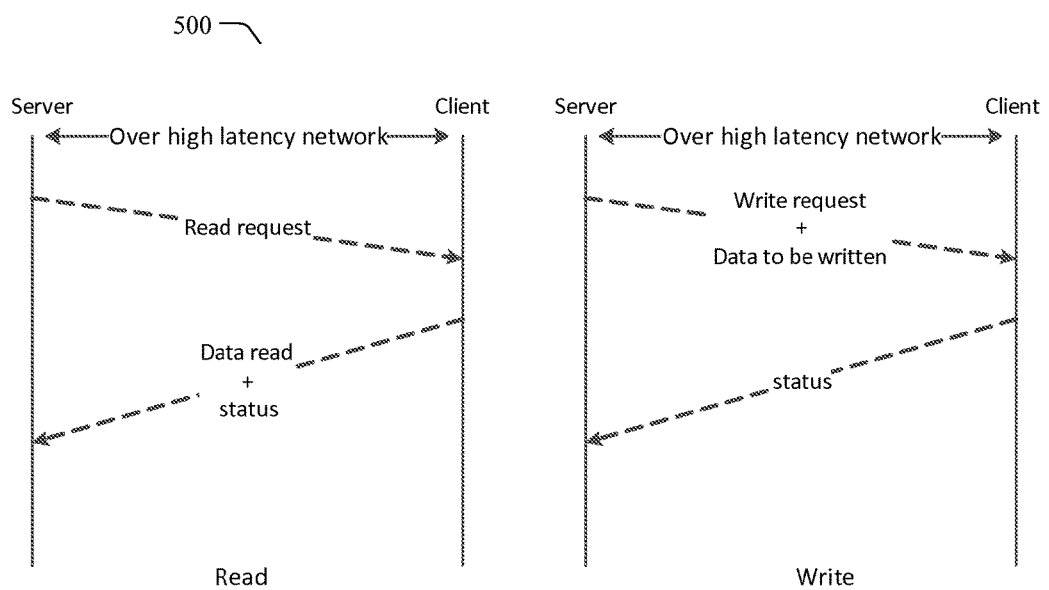
FIG. 5 illustrates transaction requests between a client and server according to one embodiment of the present disclosure.

The overhead associated with the transaction request from an application 216 is handled by the disk driver 220 and file system stack 218 reducing the number of read/write transactions that must be sent to the client 120. For example, in one embodiment the transaction request is a write request. Only the write command along with the associated data is transmitted to the client 120 and only the status is received back from the client 120 as illustrated in FIG. 5. The CBW transfer, CBW completion, and CSW request as illustrated in FIG. 7 are not necessary as the disk stack (which includes USB mass storage device driver 208 and USB hub driver 210) of the USB mass storage device 130 is kept at the client side 120 and not introduced at the server side 140. Similarly, in another embodiment the transaction request is a read request. Only the read command is transmitted to the client 120 with the client 120 returning only the data requested and the status as illustrated in FIG. 5. The CBW transfer, CBW completion and CSW request as illustrated in FIG. 7 are not necessary as the disk stack 202 of the USB mass storage device 130 is kept at the client side 120 and not introduced at the server side 140.

At step 414, the virtual disk enumerator 214 transmits the transaction request (read/write) via the proxy server 212 to the proxy client 206 which posts the transaction request to the disk stack 202 at the client 120. As shown generally at 500 of FIG. 5, according to one embodiment of the present disclosure, only the read request for the virtual disk 150 is sent from the server 140 to the client 120 which responds back to the server 140 with the data requested from the USB mass storage device 130 along with the status of the USB mass storage device 130. Likewise, according to one embodiment of the present disclosure, a write request along with the data to be written is for the virtual disk 150 is sent from the server 140 to the client 120 which responds back to the server 140 with the status of the USB mass storage device 130. Thus, only two transaction requests need be executed as compared to the at least five transaction requests required by traditional systems.

If a USB mass storage device 130 is disconnected, the OS may send a disk removal notification to the proxy client 206 and the server 140 will stop servicing any new I/O requests. The OS of the server 140, after receiving notification from the proxy server 212, will unload the file system stack 218 and the disk driver 220.

Figure 6:
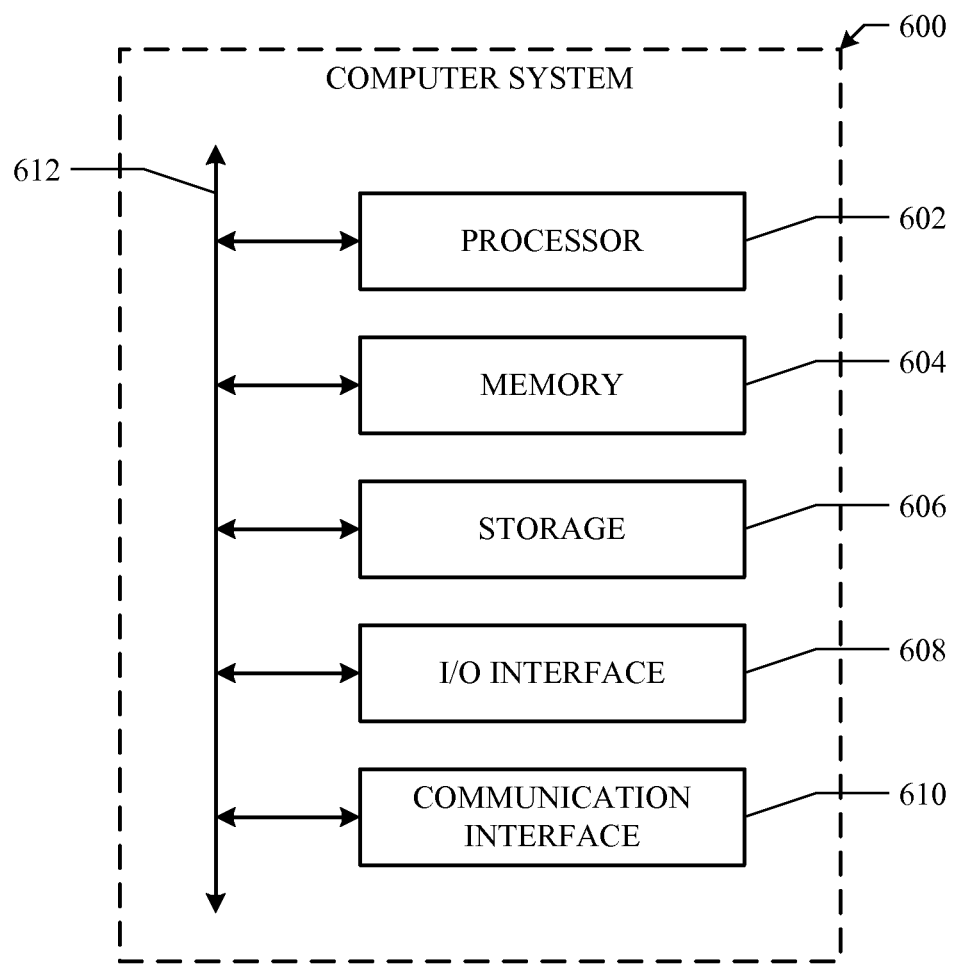
FIG. 6 illustrates an example computing system.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard-disk drive (HDD), a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, at a server, a disk arrival notification that a universal serial bus (USB) mass storage device has been coupled to a client;
   issuing a command by a proxy server to a virtual disk enumerator to create a virtual disk associated with the USB mass storage device;
   loading a disk driver corresponding to the virtual disk;
   loading a file system stack corresponding to the virtual disk on top of the disk driver;
   receiving a request associated with the virtual disk from an application;
   handling overhead of the request by the disk driver and the file system stack;
   converting the request to a corresponding storage request; and
   sending the storage request to the client via the proxy server.

2. The method of claim 1, wherein a virtual disk enumerator sends the storage request to the proxy server.

3. The method of claim 2, further comprising:
   receiving at the virtual disk enumerator the request; and
   sending by the virtual disk enumerator the storage request to the virtual disk.

4. The method of claim 1, wherein the overhead comprises one or more of command block wrapper (CBW) transfer and command status wrapper (CSW) request.

5. The method of claim 1, wherein the request is a raw write.

6. The method of claim 1, wherein the disk driver converts the request to the storage request.

7. The method of claim 1, wherein the disk driver and file system stack are loaded based, at least in part, on one or more properties of the virtual disk.

8. A system comprising:
   a first server;
   one or more central processing units for processing information of the first server;
   a memory of the first server communicatively coupled to the one or more central processing units; and
   one or more modules that comprise instructions stored in the memory, the instructions, when executed by the one or more processing units, operable to perform operations comprising:
   receiving, at a server, a disk arrival notification that a universal serial bus (USB) mass storage device has been coupled to a client;
   issuing a command by a proxy server to a virtual disk enumerator to create a virtual disk associated with the USB mass storage device;
   loading a disk driver corresponding to the virtual disk;
   loading a file system stack corresponding to the virtual disk on top of the disk driver;
   receiving a request associated with the virtual disk from an application;
   handling overhead of the request by the disk driver and the file system stack;
   converting the request to a corresponding storage request; and
   sending the storage request to the client via the proxy server.

9. The system of claim 8, wherein a virtual disk enumerator sends the storage request to the proxy server.

10. The system of claim 9, wherein the instructions further operable to perform operations comprising:
receiving at the virtual disk enumerator the request; and
sending by the virtual disk enumerator the storage request to the virtual disk.

11. The system of claim 8, wherein the overhead comprises one or more of command block wrapper (CBW) transfer and command status wrapper (CSW) request.

12. The system of claim 8, wherein the request is a raw write.

13. The system of claim 8, wherein the disk driver converts the request to the storage request.

14. The system of claim 8, wherein the disk driver and file system stack are loaded based, at least in part, on one or more properties of the virtual disk.

15. One or more computer-readable non-transitory storage media embodying software operable when executed by one or more computer systems to:
receive, at a server, a disk arrival notification that a universal serial bus (USB) mass storage device has been coupled to a client;
issue a command by a proxy server to a virtual disk enumerator to create a virtual disk associated with the USB mass storage device;
load a disk driver corresponding to the virtual disk;
load a file system stack corresponding to the virtual disk on top of the disk driver;
receive a request associated with the virtual disk from an application;
handle overhead of the request by the disk driver and the file system stack;
convert the request to a corresponding storage request; and
send the storage request to the client via the proxy server.

16. The media of claim 15, wherein a virtual disk enumerator sends the storage request to the proxy server.

17. The media of claim 16, wherein the software is further operable when executed to:
receive at the virtual disk enumerator the request; and
sending by the virtual disk enumerator the storage request to the virtual disk.

18. The media of claim 15, wherein the overhead comprises one or more of command block wrapper (CBW) transfer and command status wrapper (CSW) request.

19. The media of claim 15, wherein the disk driver converts the request to the storage request.

20. The media of claim 15, wherein the disk driver and file system stack are loaded based, at least in part, on one or more properties of the virtual disk.

* * * * *